US009495093B2

(12) United States Patent
Kim

(10) Patent No.: US 9,495,093 B2
(45) Date of Patent: Nov. 15, 2016

(54) MOBILE TERMINAL AND CONTROL METHOD BASED ON BODY PARTS SIGNALS

(71) Applicant: LG ELECTRONICS INC., Seoul (KR)

(72) Inventor: Jonghwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 479 days.

(21) Appl. No.: 13/649,550

(22) Filed: Oct. 11, 2012

(65) Prior Publication Data

US 2013/0257757 A1  Oct. 3, 2013

(30) Foreign Application Priority Data

Apr. 2, 2012  (KR) .......................... 10-2012-0033764

(51) Int. Cl.
    G06F 3/0488   (2013.01)
    G06F 3/043    (2006.01)
    G06F 3/16     (2006.01)

(52) U.S. Cl.
    CPC ............. *G06F 3/0488* (2013.01); *G06F 3/043* (2013.01); *G06F 3/165* (2013.01)

(58) Field of Classification Search
    CPC ...... G06F 3/043; G06F 3/044; G06F 3/0488; G06F 3/165

USPC .................................................. 345/156–184
See application file for complete search history.

(56) References Cited

U.S. PATENT DOCUMENTS

| | | | |
|---|---|---|---|
| 2011/0285667 A1* | 11/2011 | Poupyrev ....................... | 345/174 |
| 2012/0182238 A1* | 7/2012 | Lee ................................ | 345/173 |
| 2012/0295662 A1* | 11/2012 | Haubrich .................... | 455/556.1 |
| 2013/0132094 A1* | 5/2013 | Lim .............................. | 704/275 |
| 2013/0147836 A1* | 6/2013 | Small et al. .................. | 345/633 |
| 2013/0147838 A1* | 6/2013 | Small et al. .................. | 345/633 |
| 2014/0289659 A1* | 9/2014 | Harrison et al. .............. | 715/765 |

OTHER PUBLICATIONS

Harrison et al., TapSense: Enhancing Finger Interaction on Touch Surfaces, Oct. 16, 2011, ACM New York, NY, USA © 2011, UIST '11 Proceedings of the 24th annual ACM symposium on User interface software and technology, pp. 627-636.*

* cited by examiner

*Primary Examiner* — Dmitriy Bolotin
(74) *Attorney, Agent, or Firm* — Ked & Associates, LLP

(57) ABSTRACT

A mobile terminal includes a communication unit, a sensor to sense a first body signal from a first body part and a controller. The controller determines a first target device corresponding to the first body signal and generates a signal for output to the first target device through the communication unit. The first body signal includes information indicative of a characteristic of the first body part. Alternatively, the first target device may be determined by a server coupled to the mobile terminal.

35 Claims, 12 Drawing Sheets

FIG. 6
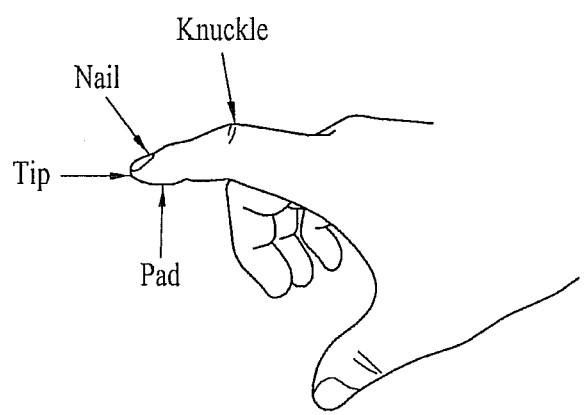
(a)
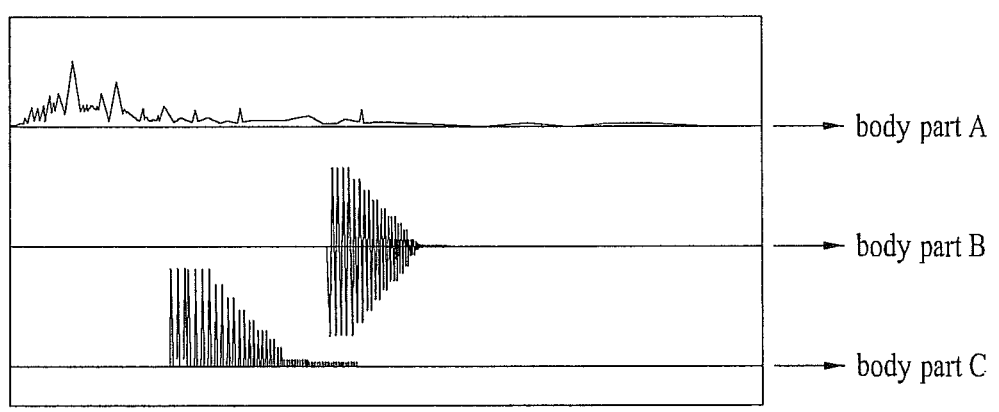
(b)

(a)

| Device ID | Recognized external target device | analyzed speech | Control command |
|---|---|---|---|
| XX:XX:00:11 | refrigerator | Any milk left | refrigerator food monitoring |
| XY:XY:01:11 | TV | switch to channel 11 | channel controlling |

(b)

(a)

| Device ID | Alias naming | Recognized external target device | analyzed speech | Control command |
|---|---|---|---|---|
| XX:XX:00:11 | refri | refrigerator | Any milk left? | refrigerator food monitoring |
| XY:XY:01:11 | box | TV | Raise a volume | TV volume controlling |

(b)

MOBILE TERMINAL AND CONTROL METHOD BASED ON BODY PARTS SIGNALS

Pursuant to 35 U.S.C. §119(a), this application claims the benefit of the earlier filing date and right of priority to Korean Application No. 10-2012-0033764, filed on Apr. 2, 2012, the contents of which are hereby incorporated by reference.

BACKGROUND

1. Field

One or more embodiments herein relate to control of a mobile terminal.

2. Background

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or moving pictures, playback of music or moving picture files, game play, broadcast reception and the like for example.

To support and increase of the terminal functions, it may be able to consider the improvement of structural part and/or software part of the terminal.

To support and increase the terminal functions, it may be able to consider the improvement of structural parts and/or software parts of the terminal.

As a terminal tends to be equipped with various functions including the above-mentioned functions, the importance of a user interface configured to facilitate manipulations of various functions increasingly rises. The ongoing development of a user interface makes progress toward one direction of selecting a desired icon from various kinds of icons displayed on a display unit of a terminal.

On the other hand, the necessity for a natural user interface (NUI) is raised in another development direction of a user interface to manipulate a device through user's natural speech, action, handwriting and the like. In particular, a device is capable of understanding user's speech, writings, gesture and the like and is then able to reason user's intention and context contained therein. Therefore, the demand for a method of controlling a terminal using NUI is rising.

SUMMARY

In accordance with one embodiment, a mobile terminal and control method thereof is provided in which, when the mobile terminal having NUI technique applied thereto comes in contact with a specific body part of a user, an external target device corresponding to the specific body part can be confirmed.

In accordance with another embodiment, a mobile terminal and control method thereof is provided, in which a control operation desired by a user is performed on a confirmed external target device via a speech command of the user.

In accordance with another embodiment, a mobile terminal includes a wireless communication unit, a sensing unit configured to sense a body frequency characteristic of a body signal generated from a specific body part of a user carrying the mobile terminal, a microphone configured to receive a speech from the user, and a controller determining the specific body part using the body frequency characteristic sensed by the sensing unit, the controller confirming a specific external target device previously matched to the specific body part, the controller determining a previously provided control command to control the specific external target device based on the speech received by the microphone, the controller outputting a control signal for the specific external target device corresponding to the previously provided control command via the wireless communication unit.

Preferably, the body signal may be generated in one of a $1^{st}$ case that the user touches the specific body part with a hand of the user while wearing the mobile terminal on a random body part of the user, a $2^{nd}$ case that the user wears the mobile terminal on the specific body part of the user, and a $3^{rd}$ case that the user touches the mobile terminal with the specific body part.

Preferably, the mobile terminal may further include a memory configured to store a matching information on each external target device matched to each body part of the user and a previously provided control command information on the each external target device.

Preferably, the wireless communication unit may transmit the control signal for controlling the specific external target device to the specific external target device.

Preferably, the wireless communication unit may transmit the control signal to an external server configured to manage a plurality of external target devices.

Preferably, the mobile terminal may further include a position location module configured to determine a current location of the mobile terminal. In this case, the controller determines whether to transmit the control signal to the specific external target device directly or to transmit the control signal to an external server configured to manage a plurality of external target devices in accordance with the current location of the mobile terminal. And, the controller controls the wireless communication unit to transmit the control signal in accordance with a result of the determination.

Preferably, the controller may analyze the speech received from the microphone and confirm the specific external target device in accordance with a result of the analysis.

Preferably, the mobile terminal may further include an audio output module configured to output a warning sound. If the previously provided control command is not determined from the received speech, the controller may control the audio output module to output the warning sound.

Preferably, the external target device may include one of a refrigerator, a web camera, a gas circuit breaker, a fire alarm, a television, a radio receiver, a computer, a door lock, an illumination device and a vehicle.

In accordance with another embodiment, a method of controlling a mobile terminal includes sensing a body frequency characteristic of a body signal generated from a specific body part of a user carrying the mobile terminal, determining the specific body part using the sensed body frequency characteristic, confirming a specific external target device previously matched to the specific body part, receiving a speech from the user, determining a previously provided control command to control the specific external target device based on the speech, and outputting a control signal for the specific external target device corresponding to the previously provided control command.

Preferably, the body signal may be generated in one of a $1^{st}$ case that the user touches the specific body part with a hand of the user while wearing the mobile terminal on a random body part of the user, a $2^{nd}$ case that the user wears the mobile terminal on the specific body part of the user, and a $3^{rd}$ case that the user touches the mobile terminal with the specific body part.

Preferably, the method may further include the step of storing a matching information on each external target device matched to each body part of the user and a previously provided control command information on the each external target device.

Preferably, the method may further include the step of transmitting the control signal for controlling the specific external target device to the specific external target device.

Preferably, the method may further include the step of transmitting the control signal to an external server configured to manage a plurality of external target devices.

Preferably, the method may further include the steps of determining a current location of the mobile terminal via a position location module, determining at least one of the specific external target device and an external server as a transmission target, to which the control signal will be transmitted, in accordance with the current location of the mobile terminal, and transmitting the control signal to the determined transmission target.

Preferably, the specific external target device confirming step may include the steps of analyzing the received speech and confirming the specific external target device in accordance with a result of the analyzing step.

Preferably, the method may further include the step of outputting a warning sound if the previously provided control command is not determined from the received speech.

Preferably, the external target device may include at least one of a refrigerator, a web camera, a gas circuit breaker, a fire alarm, a television, a radio receiver, a computer, a door lock, an illumination device and a vehicle.

BRIEF DESCRIPTION OF THE DRAWINGS

FIG. 6 shows a body frequency characteristic difference in accordance with one or more body parts.

DETAILED DESCRIPTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts. The suffixes 'module' and 'unit' for the elements used in the following description are given or used in common by considering facilitation in writing this disclosure only but fail to have meanings or roles discriminated from each other.

First of all, mobile terminals described in this disclosure can include a mobile phone, a smart phone, a laptop computer, a digital broadcast terminal, a PDA (personal digital assistants), a PMP (portable multimedia player), a navigation system and the like. Except a case applicable to a mobile terminal only, it is apparent to those skilled in the art that the configurations according to an embodiment described in this disclosure is applicable to such a stationary terminal as a digital TV, a desktop computer and the like.

Figure 1:
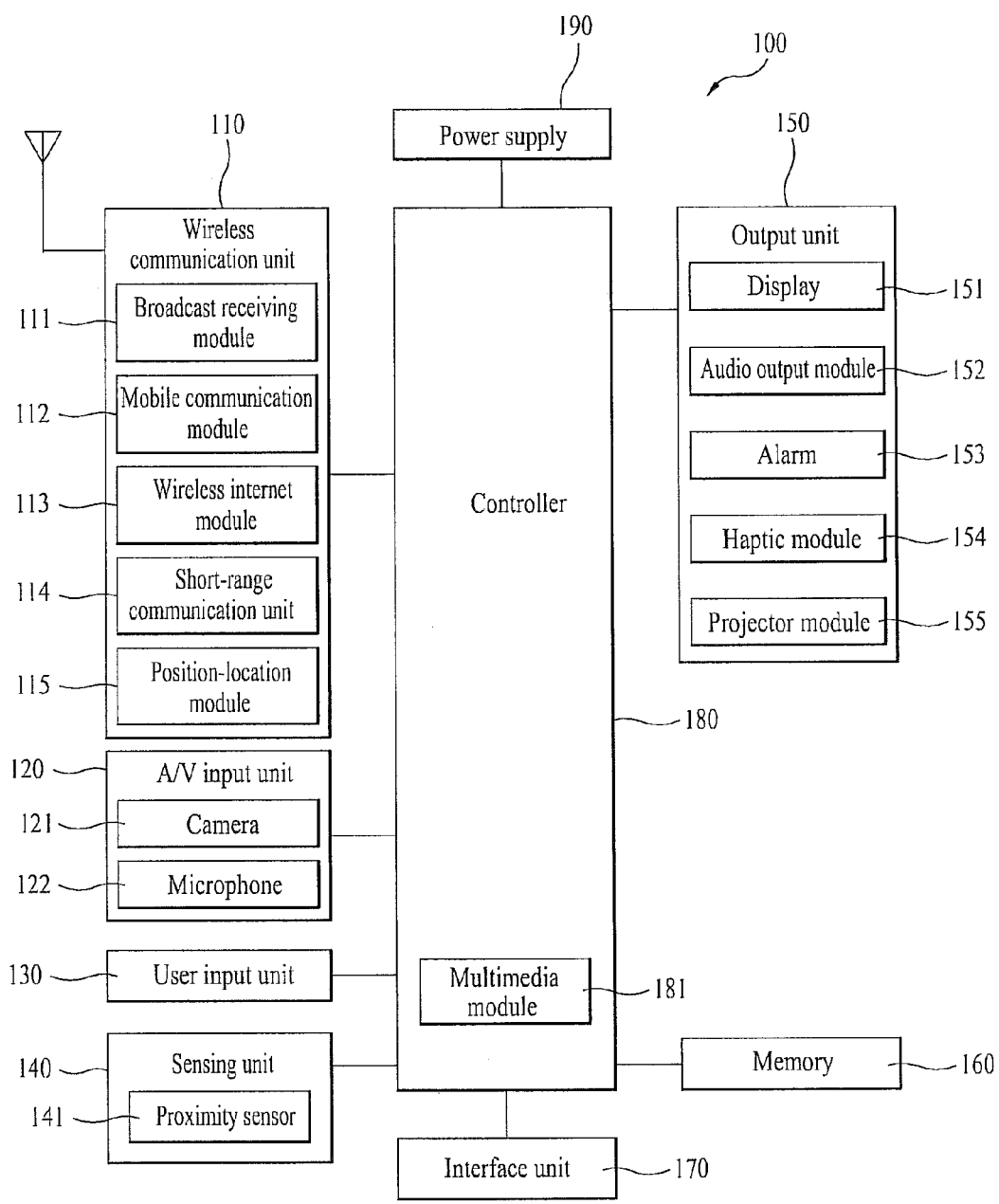
FIG. 1 shows one embodiment of a mobile terminal.

FIG. 1 is a block diagram of one embodiment of a mobile terminal 100 which includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various focus. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceiving, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display unit 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone cell mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display unit 151, an audio output module 152, an alarm unit 153, a haptic module 154, a projector module 155 and the like.

The display unit 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display unit 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display unit 151 can be implemented in the optical transmittive type as well. In this configuration, a user is able to see an object in rear of a terminal body via the area occupied by the display unit 151 of the terminal body.

At least two display units 151 can be provided to the mobile terminal 100 in accordance with the implemented configuration of the mobile terminal 100. For instance, a plurality of display units can be arranged on a single face of the mobile terminal 100 in a manner of being spaced apart from each other or being built in one body. Alternatively, a plurality of display units can be arranged on different faces of the mobile terminal 100.

In case that the display unit 151 and a sensor for detecting a touch action (hereinafter called 'touch sensor') configures a mutual layer structure (hereinafter called 'touchscreen'), it is able to use the display unit 151 as an input device as well as an output device. In this case, the touch sensor can be configured as a touch film, a touch sheet, a touchpad or the like.

The touch sensor can be configured to convert a pressure applied to a specific portion of the display unit 151 or a variation of a capacitance generated from a specific portion of the display unit 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of display unit 151 is touched.

Referring to FIG. 1, a proximity sensor can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display unit 151 or the audio output unit 152. Hence, the display unit 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hot/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display unit 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectable to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
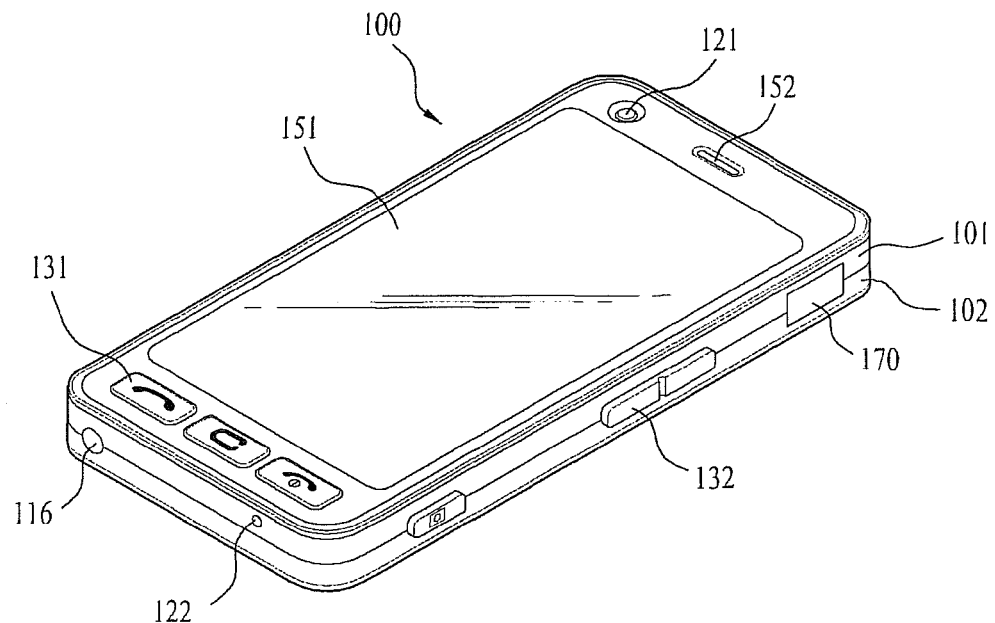
FIG. 2A shows a front perspective of one embodiment of a mobile terminal and FIG. 2B shows a rear perspective of the mobile terminal.

FIG. 2A shows one possible front perspective of a mobile terminal. The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition. The cases 101 and 102 are formed by injection molding of synthetic resin or can be formed of metal substance such as stainless steel (STS), titanium (Ti) or the like for example.

A display unit 151, an audio output unit 152, a camera 121, user input units 130/131 and 132, a microphone 122, an interface 180 and the like can be provided to the terminal body, and more particularly, to the front case 101.

The display unit 151 occupies most of a main face of the front case 101. The audio output unit 151 and the camera 121 are provided to an area adjacent to one of both end portions of the display unit 151, while the user input unit 131 and the microphone 122 are provided to another area adjacent to the other end portion of the display unit 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display unit 151 or the like can be inputted to the second manipulating unit 132.

Figure 2B:
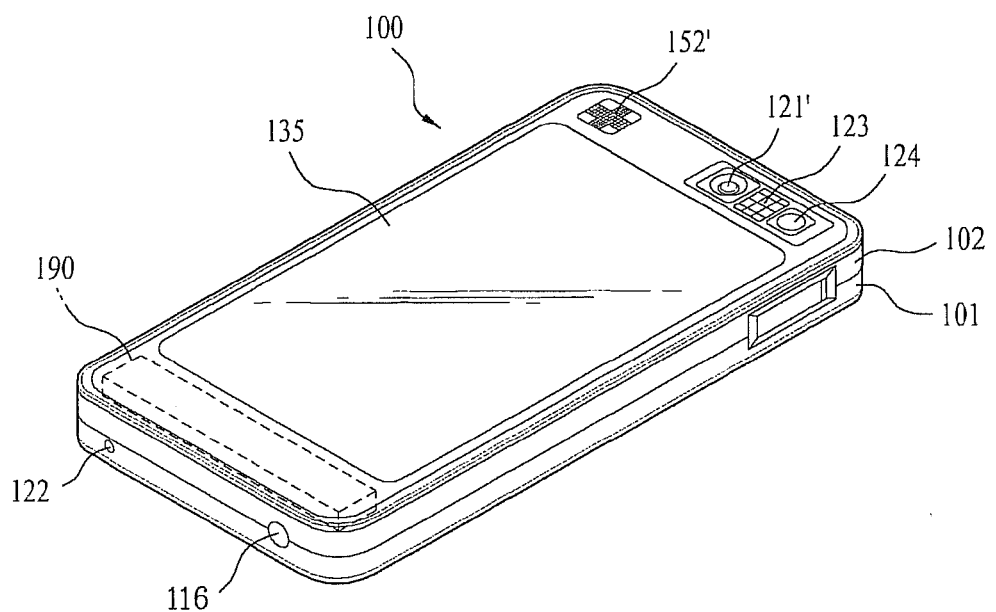

FIG. 2B shows one possible configuration of a backside of the terminal shown in FIG. 2A. Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display unit 151. In this case, if the display unit 151 is configured to output visual information from its both faces, it is able to recognize the visual information via the touchpad 135 as well. The information outputted from both of the faces can be entirely controlled by the touchpad 135. Alternatively, a display is further provided to the touchpad 135 so that a touchscreen can be provided to the rear case 102 as well.

The touchpad 135 is activated by interconnecting with the display unit 151 of the front case 101. The touchpad 135 can be provided in rear of the display unit 151 in parallel. The touchpad 135 can have a size equal to or smaller than that of the display unit 151.

In the following description, embodiments for a controlling method implemented in the above-configured mobile terminal are explained with reference to the accompanying drawings.

Figure 3:
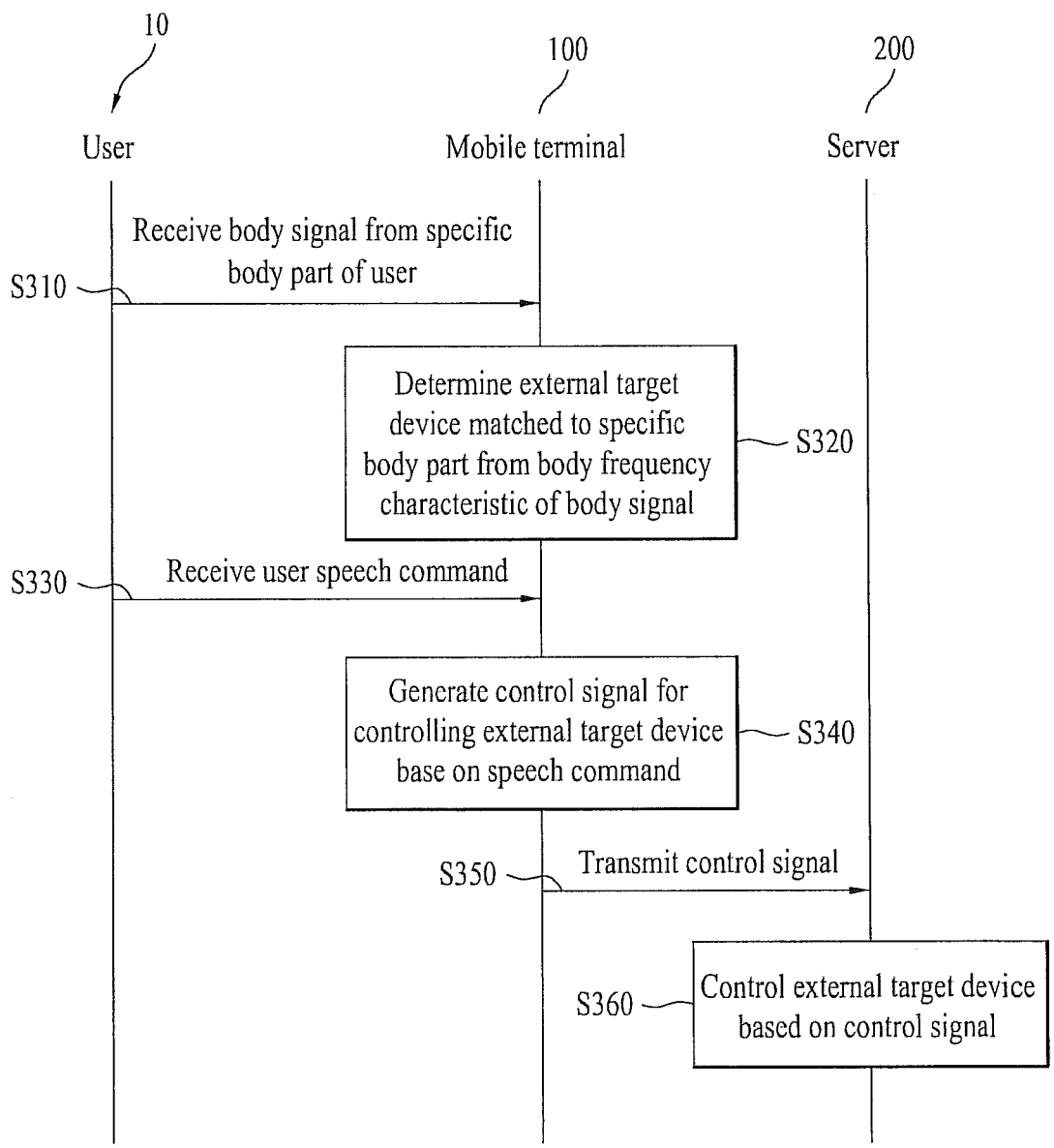
FIG. 3 shows one embodiment of a control method of a mobile terminal.

FIG. 3 is shows one embodiment of a method of controlling a mobile terminal. Referring to FIG. 3, the mobile terminal 100 receives a body signal from a specific body part of a user 10 [S310]. The mobile terminal 100 determines an external target device, which matches the specific body part, based on the received body signal [S320]. The mobile terminal 100 receives a user speech command from the user 10 [S330]. The mobile terminal 100 generates a control signal for controlling the external target device based on the received speech command [S340]. The mobile terminal 100 transmits the generated control signal to an external server 200 [S350]. Subsequently, the external server 200 controls external target devices based on the received control signal [S360].

In accordance with one embodiment, the external target device via a user's action (e.g., a body contact, a speech reception, etc.) is confirmed and then a control command for controlling the confirmed external target device via a user speech is checked.

From the standpoint of a user who uses the mobile terminal 100, it may be convenient for the user to manipulate a device by such a user-friendly way as a natural speech, an action, a handwriting and the like. Hence, a way of manipulating a device by such a natural action conducted by a user is generally called a natural user interface (hereinafter abbreviated NUI). According to the present invention in conjunction with the NUI, a user intends to control an external target device using an action of contact with a terminal, a speech action on a terminal or the like.

In accordance with one embodiment, a user of a mobile terminal may control a specific external target device desired by the user via a user-desired action. Hence, this embodiment may use a process for exactly confirming a specific external target device desired by a user and a process for determining how the user wants to control the corresponding external target device.

With respect to those processes, various embodiments may be implemented. According to a first embodiment, using a fact that specific human body parts have body frequency characteristics differing from each other, an external target device is confirmed and a control command for the external target device is then determined via a speech command. According to a second embodiment, the external target device is confirmed and controlled by analyzing a user's speech. In both the first and second embodiments, the mobile terminal 100 may check a natural specific action of a user and then generate a control signal for an external target device through an interpreting process related to the specific action.

Figure 4:
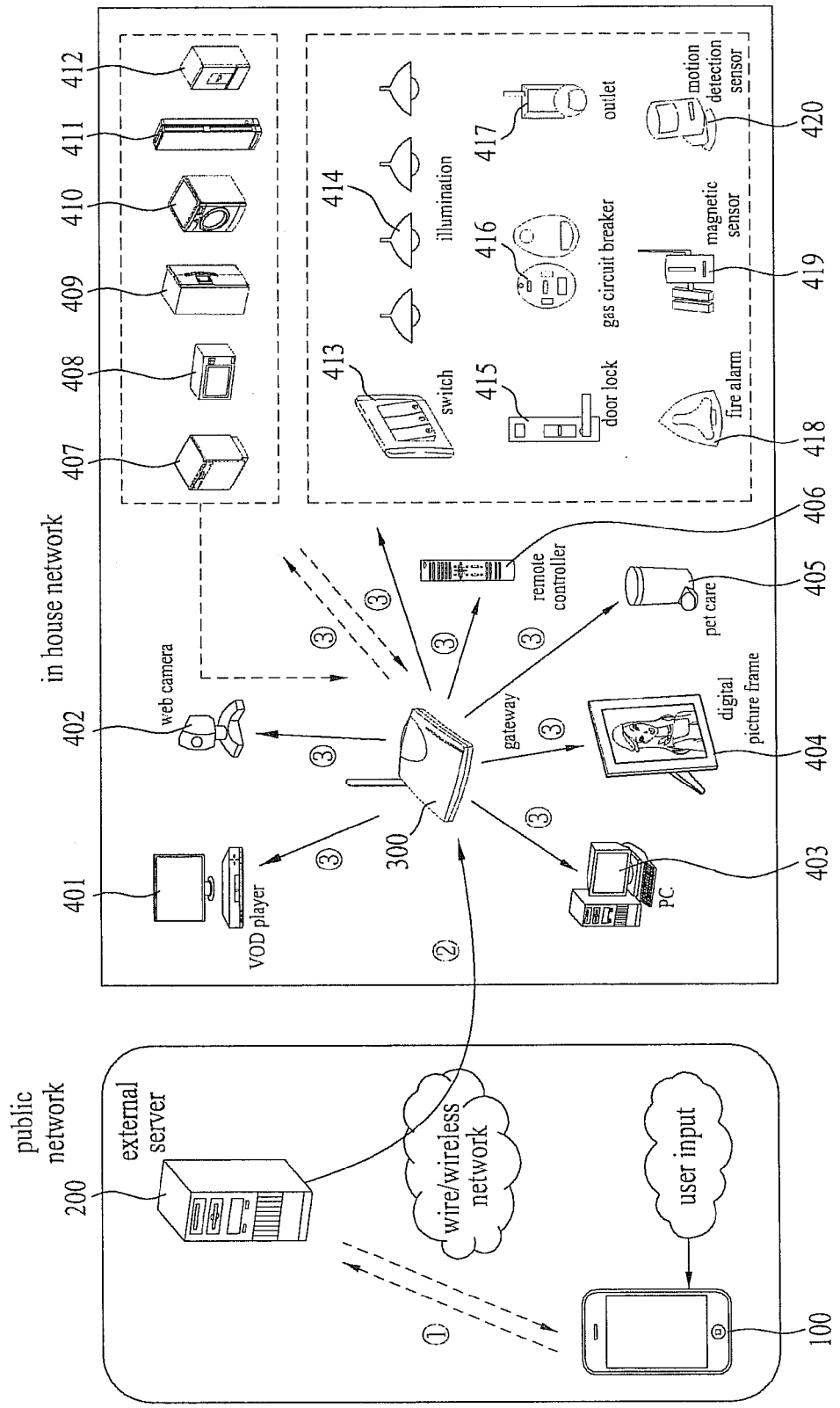
FIG. 4 shows an example of a configuration system applicable to one or more embodiments herein.

FIG. 4 shows one example of a configuration system for controlling one or more external target devices using the mobile terminal 100. The system may include the mobile terminal 100, an external server 200, a gateway 300 and the external target devices 401 to 420.

In this system, the mobile terminal 100 confirms an external target device by analyzing a user input from a user and then generates a control signal for controlling the confirmed external target device by analyzing a control command for the confirmed external target device. The generated control signal is delivered to the external server 200.

Optionally, the mobile terminal 100 simply receives a user input from the user and may then forward a user input information to the external server 200. If so, the external server 200 identifies an external target device via the user input information and may be then able to determine a control command for the external target device.

For instance, assuming a case of using a body frequency characteristic, when a specific body part of a user comes in contact with the mobile terminal 100, the mobile terminal 100 may forward information on the contact with the specific body part to the external server 200. Subsequently, the external server 200 identifies an external target device previously matched to the contacted specific body part based on a previously stored database and may be then able to generate a control signal correspondingly.

Thus, if the control signal for the specific external target device is generated by the external server 200 or the mobile terminal 100, the external server 200 forwards the control signal to the gateway 300. The gateway 300 confirms a specific external target device information contained in the control signal and then controls a specific one of a plurality of the connected or accessed external target devices 401 to 420 to perform an actually wanted control operation.

In doing so, the mobile terminal 100 and the external server 200 may be connected with each other via all existent connecting techniques. The external server 200 and the gateway 300 may be connected with each other via all existent connecting techniques. The gateway and each of the external target devices 401 to 420 may be connected with each other via all existent connecting techniques.

For instance, the mobile terminal 100 can be connected with the external server 200 via the wireless communication unit 110 by one of GSM (global system for mobile communications), CDMA (code division multiple access), WCDMA (wideband CDMA) and the like, by which the connection technique is non-limited. Moreover, wireless Internet techniques, short range communication techniques and the like may be applicable to the connecting techniques.

In the system shown in FIG. 4, the mobile terminal 100 may be able to play a role as a controller despite using the conventional home networking system. In particular, since the mobile terminal 100 provides a control signal or an input signal to the external server, even if the mobile terminal 100 is not situated in the vicinity of the external target device, the mobile terminal 100 is facilitated to control the corresponding external target device via the external server 200 and the gateway 300.

Figure 5:
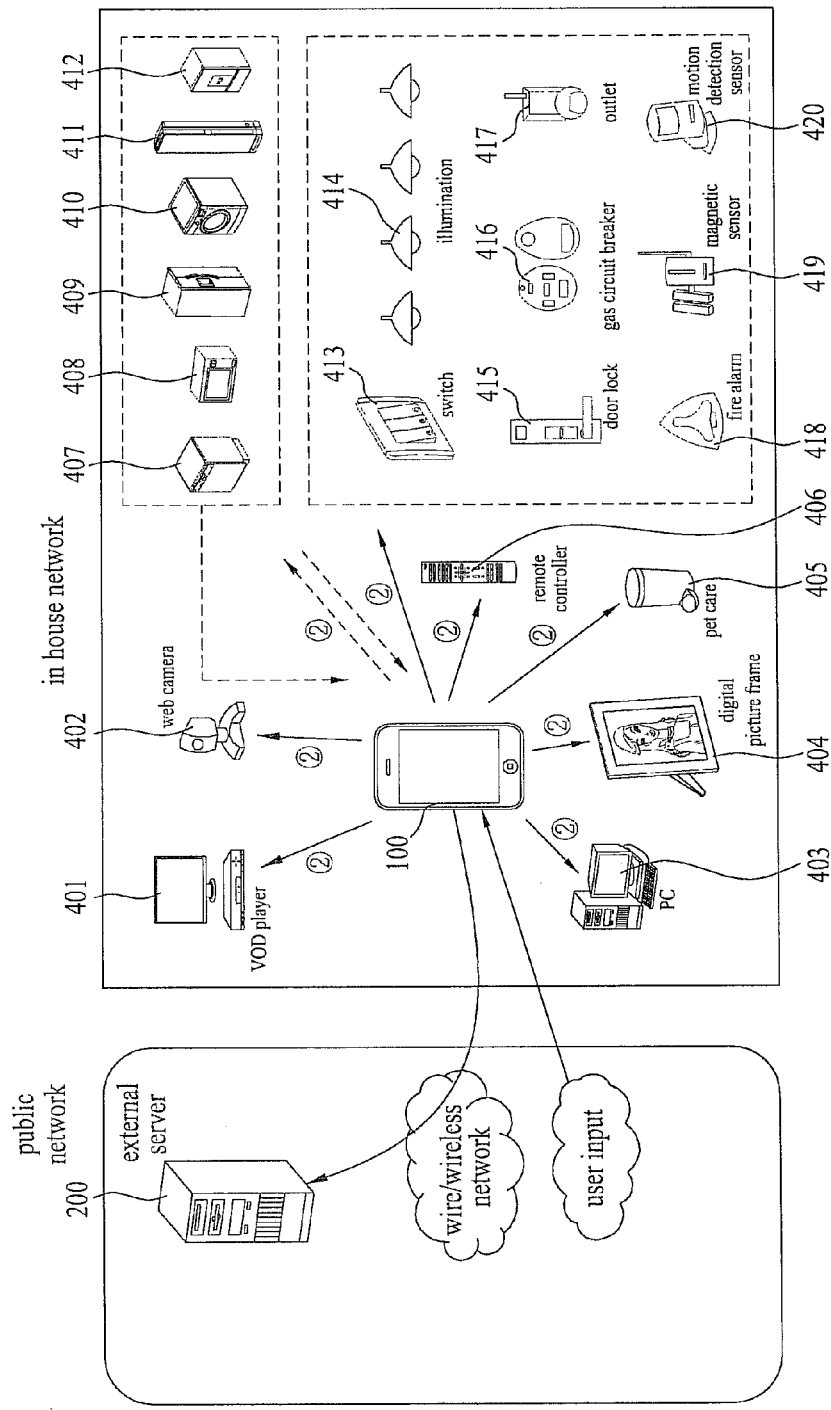
FIG. 5 shows another example of a configuration system.

FIG. 5 shows another example of a configuration system. In this system, the mobile terminal 100 may be able to directly control external target devices 401 to 420 without a relay operation via other devices. The present configuration system may include the mobile terminal 100 and the external target device 401 to 420 as control targets. In particular, an external server 200 may be regarded as one of the control targets corresponding to the external target devices.

According to this system, the mobile terminal 100 confirms an external target device by analyzing a user input from a user and then generates a control signal for controlling the corresponding external target device by analyzing a control command for the confirmed external target device. Subsequently, the generated control signal is directly transmitted not to the external server 200 but to the corresponding external target device.

In particular, the mobile terminal 100 may confirm an external target device and then transmit a control signal to the confirmed external target device only via the wireless communication unit 110. Having received the control signal, the external target device is controlled in accordance with a command signal contained in the control signal.

In the above description, the systems are explained with reference to FIG. 4 and FIG. 5. Yet, optionally, the systems can be alternatively usable. In particular, the position location module 115 of the mobile terminal 100 obtains a current location of the mobile terminal 100 and may be able to alternatively use the system suitable for the current location.

For instance, if the current location of the mobile terminal 100 is determined as a home, the system shown in FIG. 5 is applied in order for the mobile terminal 100 to be able to directly control external target devices. For another instance, if the current location of the mobile terminal 100 is determined as a company, the system shown in FIG. 4 is applied in order for the mobile terminal 100 to be able to indirectly control external target devices in a manner of transmitting a control signal to the external server 200.

In FIG. 4 or FIG. 5, various external target devices are shown. For example, the various external target devices shown in FIG. 4 or FIG. 5 may include a VOD player 401, a web camera 402, a PC (personal computer) 403, a digital picture frame 404, a pet care 405, a remote controller 406, a gas range 407, a microwave range 408, a refrigerator 409, a washer 410, an air conditioner 411, a water purifier 412, a switch 413, an illumination 414, a door lock 415, a gas circuit breaker 416, an outlet 417, a fire alarm 418, a magnetic sensor 419, a motion detection sensor 420 and the like. Namely, the above-enumerated external target devices may become the control targets of the mobile terminal 100.

In the following description, a process for the mobile terminal 100 according to the present invention to confirm an external target device from a user's action and to determine a command for controlling the confirmed external target device is explained in detail. According to the first embodiment, an external target device is confirmed using a frequency characteristic of a human body and a control command is determined via speech.

FIG. 6 shows a body frequency characteristic difference that may exist for different body parts. Referring to FIG. 6, a human body generates a signal having a frequency characteristic that varies in accordance with a specific body part. In the present specification, this signal shall be named a body signal and, and in accordance with one non-limiting embodiment, information on each body signal may be referred to as a body frequency characteristic. In other embodiments, characteristics different from frequency (e.g., temperature, pressure, or other biometric or body-based signals or characteristics may correspond to the body signal information.

In accordance with one embodiment, a body frequency characteristic may indicate a characteristic for confirming a signal such as a signal band of a body signal generated from a specific body part, an amplitude of the body signal and the like.

As an example of a technique of using different body frequency characteristics, there is TapSense technique. According to the TapSense technique, a variation is sensed using a frequency recognition technique and a different frequency characteristic can be detected in case of a body contact occurrence.

According to the TapSense technique, a knuckle, a fingernail, a fingertip and a finger pad are recognized differently. If a touchscreen is touched with each different part of a finger [FIG. 6 (a)], it can be observed that a signal having a different frequency characteristic is generated [FIG. 6 (b)]. In order to check or confirm a generated signal, an inexpensive microphone may be attached to the touchscreen.

According to one embodiment, in order to check a body frequency characteristic difference in accordance with a body part, the sensing unit 140 may further include a microphone or an ultrasonic sensor. If a specific body part is contacted, it may be able to analyze a corresponding resonance frequency. And, this resonance frequency may be determined as a body frequency characteristic of the specific body part.

Figure 7:
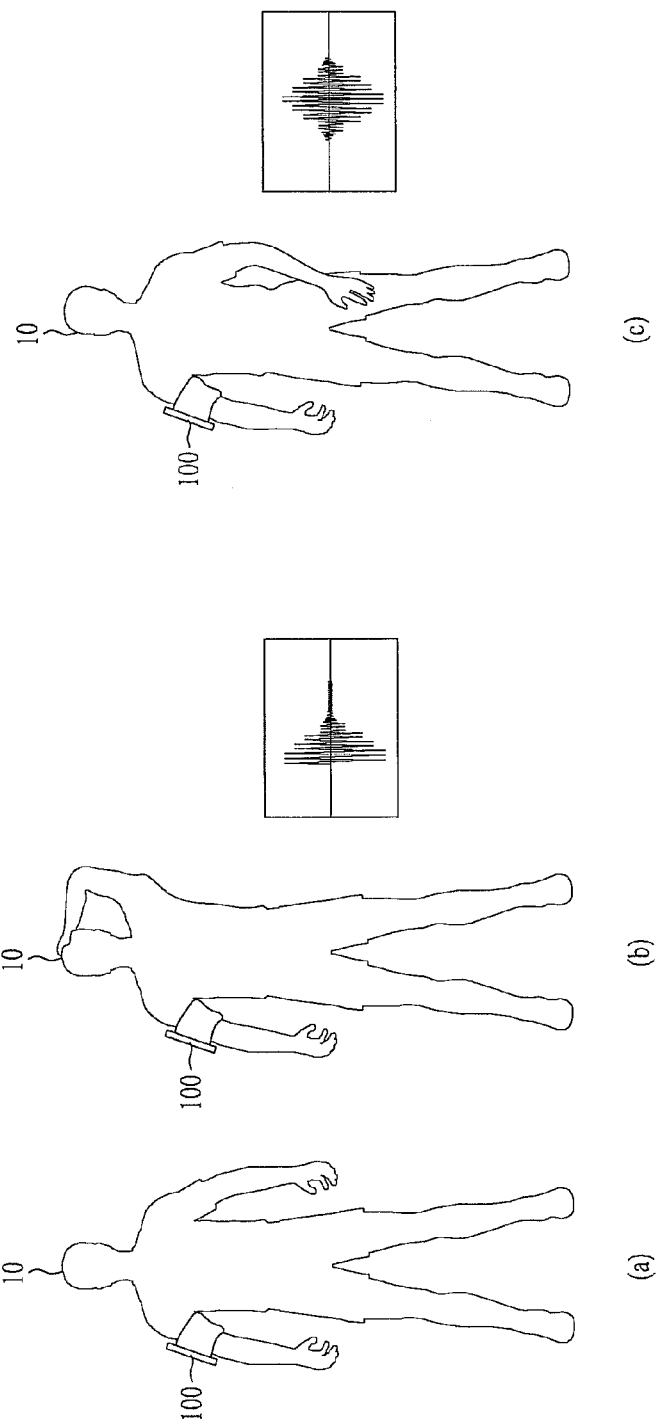
FIG. 7 shows a first embodiment in which a body signal having a body frequency characteristic is generated differently for different body parts.

FIG. 7 shows a first embodiment in which a body signal having a body frequency characteristic is generated differently for different body parts. In this first embodiment, a different body frequency characteristic of a body signal is checked, while the mobile terminal 100 is attached to a specific position of a user's body of a user. When attached, if a user's hand comes in contact with a specific part of the user's body or the specific part of the user's body is grabbed with the user's hand, the sensing unit 140 may be able to sense which part is touched with the hand.

Referring to FIG. 7 (*a*), the mobile terminal 100 is attached to a right arm of a user 10. Referring to FIG. 7 (*b*), while the mobile terminal 100 is attached to the right arm of the user 10, a left hand comes in contact with a user's head. Looking into a graph shown in the drawing, it may be able to check that a specific signal is generated from a specific part called a head. And, a specific frequency of the specific signal for the head may be discriminated from a body frequency characteristic of another part of the body.

Referring to FIG. 7 (*c*), while the mobile terminal 100 is attached to the right arm of the user 10, a left hand comes in contact with a user's left thigh. Looking into a graph shown in the drawing, it may be able to check that a specific signal is generated from a specific part called a left thigh. Hence, it can be confirmed that the body frequency characteristic of the generated body signal in FIG. 7 (*b*) and the body frequency characteristic of the generated signal in FIG. 7 (*c*) can be discriminated from each other.

Referring to FIG. 7, when different parts are contacted, the sensing unit 140 of the mobile terminal 100 attached to the right arm determines the body signals and the body frequency characteristics. Hence, the controller 180 may be able to confirm an external target device that matches each of the body frequency characteristics using the determined body frequency characteristics.

Figure 8:
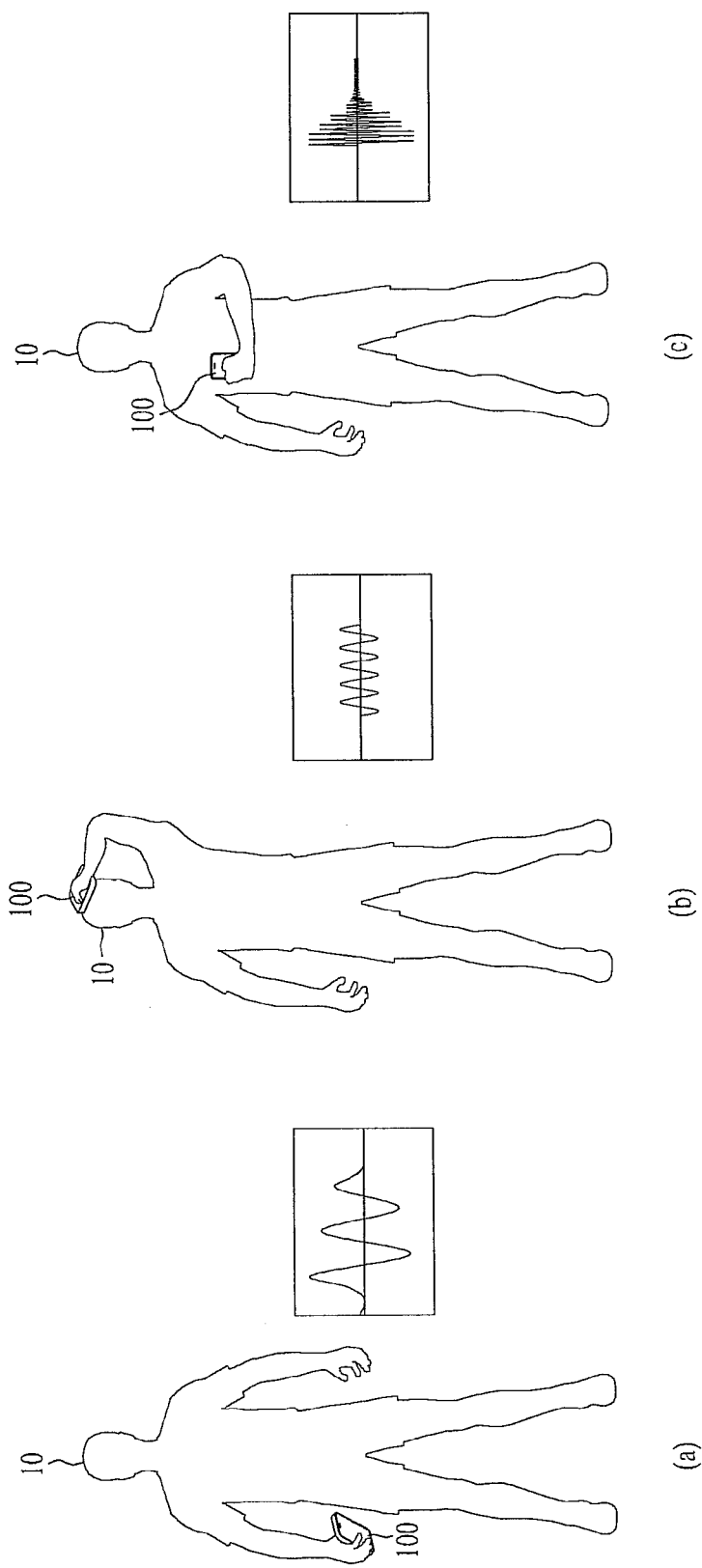
FIG. 8 shows a second embodiment in which a body signal having a body frequency characteristic is generated differently from for different body parts.

FIG. 8 shows a second embodiment in which a body signal having a body frequency characteristic is generated differently for different body parts. Referring to FIG. 8, a different body frequency characteristic of a body signal is checked when the mobile terminal 100 comes in direct contact with a specific body part of a user 10. In this case, the sensing unit 140 may be able to confirm a body signal from the body part contacting with the mobile terminal 100 and a body frequency characteristic of the body signal.

Referring to FIG. 8 (*a*), a user 10 holds the mobile terminal 100 with his right hand or the right hand of the user 10 comes in contact with the mobile terminal 10. Looking into the graph shown in the drawing, a body signal corresponding to the right hand is generated and the sensing unit 140 is then able to confirm a specific body frequency characteristic corresponding to the body signal.

Referring to FIG. 8 (*b*), a head of a user 10 comes in contact with the mobile terminal 10. Looking into the graph shown in the drawing, a body signal corresponding to the head is generated and the sensing unit 140 is then able to confirm a specific body frequency characteristic corresponding to the body signal.

Referring to FIG. 8 (*c*), a right chest of a user 10 comes in contact with the mobile terminal 10. Looking into the graph shown in the drawing, a body signal corresponding to the right chest is generated and the sensing unit 140 is then able to confirm a specific body frequency characteristic corresponding to the body signal.

Meanwhile, in FIG. 8 (*b*), the head of the user 10 comes in contact with the mobile terminal 100 while the user 10 holds the mobile terminal 100 with the left hand. And, in FIG. 8 (*c*), the right chest of the user 10 comes in contact with the mobile terminal 100 while the user 10 holds the mobile terminal 100 with the left hand.

Hence, it may be necessary for the sensing unit 140 to discriminate the body signal and the body frequency characteristic according to the left hand from the body signal and the body frequency characteristic according to the right chest. In doing so, since body frequency characteristics corresponding to body parts are previously saved in the memory 160 of the mobile terminal 100, even if the sensing unit 140 receives two body signals (e.g., a body signal by the right hand and a body signal by the head or right chest), the controller 180 or the sensing unit 140 may exclude the body signal by the right hand from the result determination, thereby considering a desired body signal as a determination target only.

Figure 9:
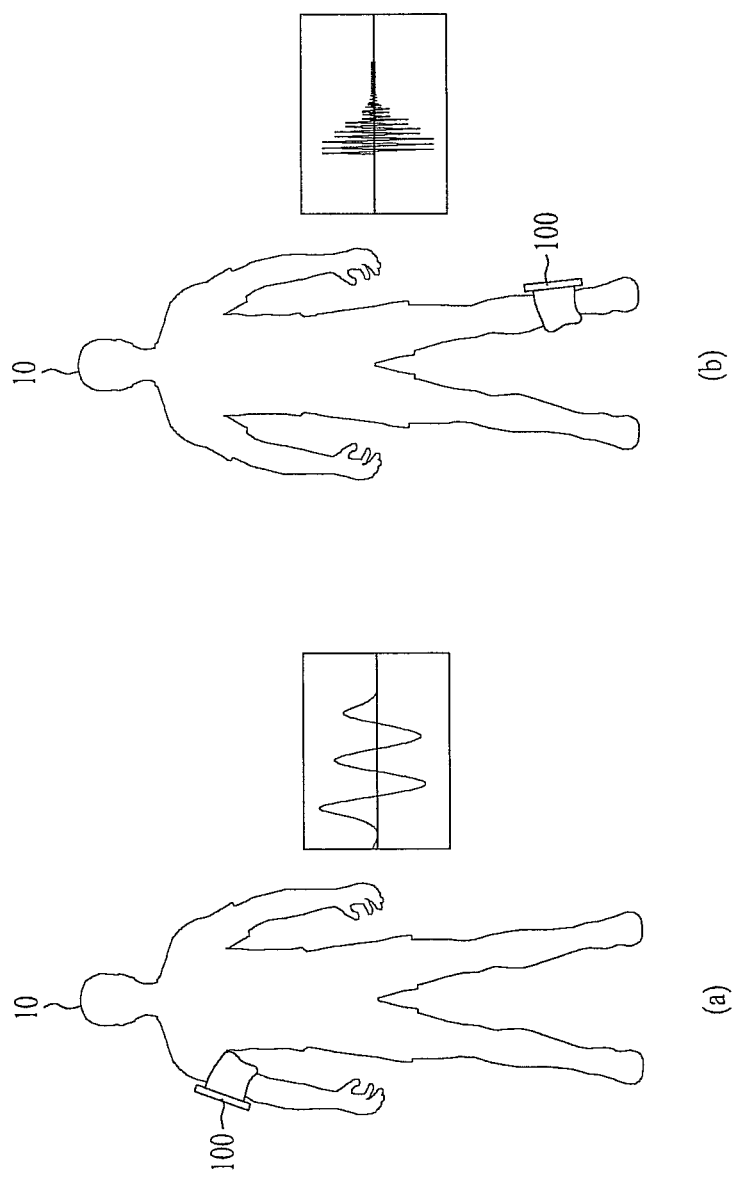
FIG. 9 shows a third embodiment in which a body signal having a body frequency characteristic is generated differently for different body parts.

FIG. 9 shows a third embodiment, in which a body signal having a body frequency characteristic is generated differently for different body parts. Referring to FIG. 9, a different body frequency characteristic of a body signal is checked when the mobile terminal 100 may be attached to each specific body part of a user 10. In this case, the sensing unit 140 may be able to confirm a body signal from the body part contacting with the mobile terminal 100 and a body frequency characteristic.

Referring to FIG. 9 (*a*), while the mobile terminal 100 is attached to a right arm of a user 10, the sensing unit 140 may be able to confirm a body signal corresponding to the right arm and a body frequency characteristic, as shown in the corresponding graph.

Referring to FIG. 9 (*b*), while the mobile terminal 100 is attached to a left ankle of a user 10, the sensing unit 140 may be able to confirm a body signal corresponding to the left ankle and a body frequency characteristic, as shown in the corresponding graph.

According to the above descriptions with reference to FIGS. 7 to 9, the sensing unit 140 checks the body signal corresponding to user's specific body part and the corresponding body frequency characteristic.

Since each signal is generated in a manner of having a body frequency characteristic different for different body parts, each body part frequency may be utilized as unique identification information. Hence, the controller 180 may match unique body part frequencies to corresponding external target devices, respectively. For instance, a body frequency characteristic of a right arm may be matched to a TV, a body frequency characteristic of a head may be matched to a radio, and a body frequency characteristic of a left hand may be matched to an illumination device.

Matching information may be previously saved in the memory 160. Hence, in case that a different body signal and a body frequency characteristic according to the different body signal are confirmed by the sensing unit 140, the controller 180 searches the saved information to confirm an external target device corresponding to the confirmed body frequency characteristic.

Meanwhile, according to the above description, the user 10 enables his body part to come in contact with the mobile terminal 100. Yet, the same method may be applicable to a case that the user 10 enables another person to come in contact with the mobile terminal 100. Moreover, it may be able to consider a case of recognizing an emotion by obtaining a body frequency characteristic of a human using a body frequency characteristic according to a body part. Hence, it may be able to consider a method of checking an emotion of a counterpart by obtaining a body frequency characteristic of the counterpart through a contact with the counterpart.

According to the above description, a body frequency characteristic is only obtained using the mobile terminal 100. Optionally, a wearable device capable of sensing a body signal may be applicable to obtain a body frequency characteristic. In particular, it may be able to assume a case that a plurality of sensors capable of sensing body signals are attached to a clothes. In this case, in case that a user touches a specific position of the clothes, the corresponding sensor obtains a specific part in response to the touch or contact and may be then able to determine an external target device corresponding to the specific part.

Figure 10:
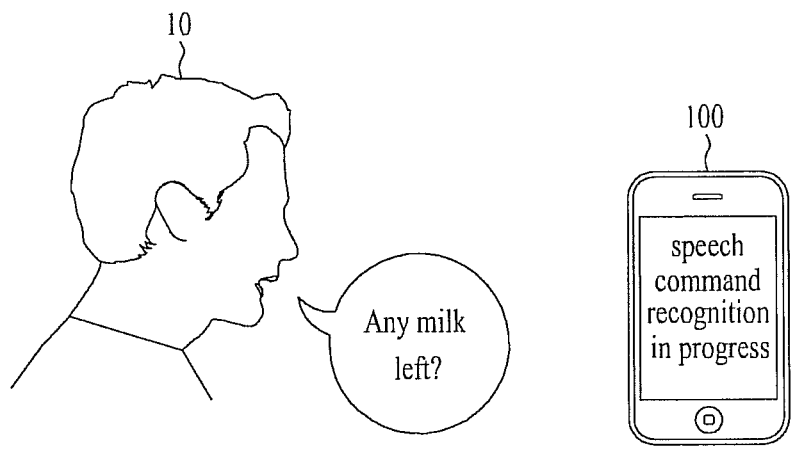
FIG. 10 shows an operation of generating a control command for controlling an external target device via a user speech according to the first embodiment.

FIG. 10 shows an operation of generating a control command for controlling an external target device via a user speech for the first embodiment. Referring to FIG. 10, after a body frequency characteristic has been confirmed, if the controller 180 determines an external target device previously matched to the body frequency characteristic, the microphone 122 may receive a speech signal from a user 10.

In doing so, a command signal for controlling the external target device matched to the body frequency characteristic may be inputted in various ways. For instance, the user may be able to directly input a text to the mobile terminal 100. According to one embodiment, a control command for controlling an external target device may be received via a user's speech.

Referring to FIG. 10 (a), the mobile terminal 100 may receive a speech from a user 10 via the microphone 122. In the drawing, for example, the user 10 may say, "Any milk left?" And, the microphone 122 may receive the corresponding speech.

If such a speech input is received via the microphone 122, the controller 180 may perform the two kinds of processes as follows. First of all, the controller 180 performs a process for receiving the speech received via the microphone 122 and recognizing the received speech as a text [STT: speech to text] and a process for interpreting the exact lingual meaning of the recognized text.

The memory 160 may be able to store a plurality of control commands for each external target device in advance. For instance, in case that the external target device is a refrigerator, such control commands related to the refrigerator as a food monitoring, a temperature controlling, a product ordering and the like can be saved in advance. For another instance, in case that the external target device is a TV, such control commands related to the TV as a channel controlling, a volume controlling, a power-on/off, a color adjustment and the like can be saved in advance. Moreover, various control commands corresponding to each external target device can be previously saved in the memory 160.

After the exact lingual meaning of the user's speech has been interpreted, the controller 180 refers to the control commands corresponding to the confirmed external target device in the memory 160 and then determines whether there is a control command corresponding to the interpreted user's speech suitable for the external target device.

In particular, referring to FIG. 10, if the user's speech is "Any milk left?" and the external target device is determined as the refrigerator, the user's speech can be determined as 'food monitoring' among the control commands for the refrigerator. In more particular, the controller 180 exactly obtains the meaning of the user's speech and may then determine the control command having the meaning most similar to or accurate for the meaning of the user's speech.

FIG. 10 (b) shows one example of speeches and control commands analyzed by the controller 180. Referring to FIG. 10 (b), assuming that a specific external target device is a refrigerator, a device ID may be regarded as a unique identification number for the mobile terminal 100 to identify the specific external target device. If the external target device confirmed by the controller 180 using the body frequency characteristic is 'refrigerator' and the analyzed speech is 'Any milk left?', the control command is determined as 'refrigerator food monitoring'. Hence, the controller 180 generates a control signal containing the food monitoring control command on the refrigerator and may then directly transmit the generated control signal to the external server 200 or the refrigerator.

Moreover, assuming that a specific external target device is a TV, if the external target device confirmed by the controller 180 using the body frequency characteristic is 'TV' and the analyzed speech is 'switched to Channel 11', the control command is determined as 'TV channel controlling'. Hence, the controller 180 generates a control signal containing the TV channel controlling control command information on the TV and may then directly transmit the generated control signal.

In the following description, a method of checking an external target device to be controlled via a user's speech according to a $2^{nd}$ embodiment is explained. An external target device can be checked by analyzing a user's speech in the $2^{nd}$ embodiment, whereas an external target device is checked using a body frequency characteristic of a user in the $1^{st}$ embodiment.

Figure 11:
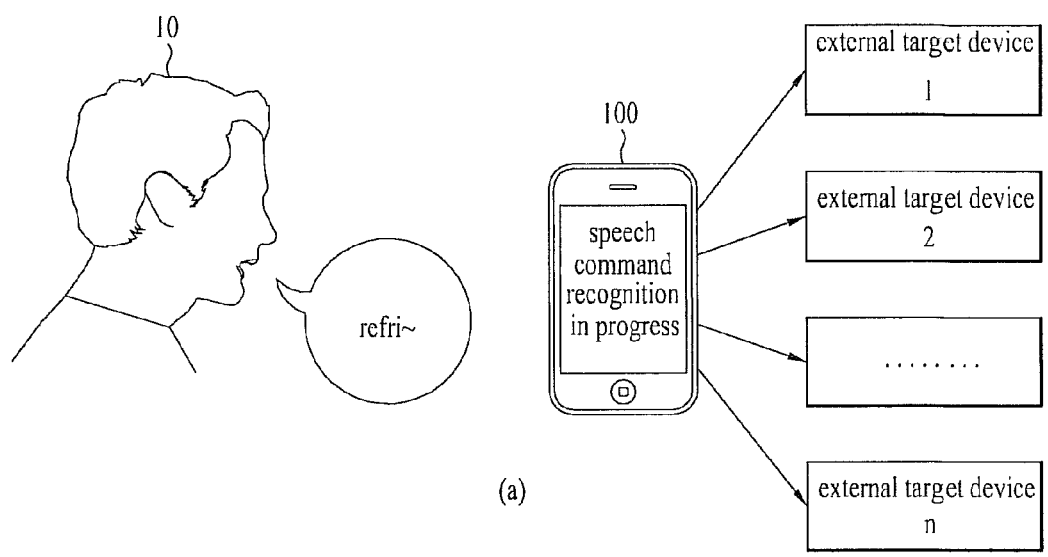
FIG. 11 shows an operation of checking an external target device via a user speech according to the second embodiment.

FIG. 11 shows an operation of checking an external target device via a user speech according to the second embodiment. Referring to FIG. 11, similar to the case shown in FIG. 10, in case that a user pages a specific external target device via a speech, the microphone 122 recognizes this speech and may be then able to check the specific external target device.

Referring to FIG. 11 (a), if a user 10 says a speech 'refri', the microphone 122 receives the speech. And, the controller 180 determines whether the external target device corresponding to the speech 'refri' exists among a plurality of external target devices. The process for obtaining the external target device via the speech may be performed in a following manner similar to that of the former process described with reference to FIG. 10.

First of all, the microphone 122 exactly recognizes the speech.

Secondly, the controller 180 analyzes the speech into a text and then determines what this text exactly means. The memory 160 stores the exact names of the external target devices controllable by the mobile terminal 100 and may also store abbreviates of the external target devices. Hence, even if the user 10 pages the abbreviation 'refri', the controller 180 may be able to determine 'refri' indicates a refrigerator using the information saved in the memory 160.

FIG. 11 (b) shows an external target device confirmed by the controller 180. Referring to FIG. 11 (b), as mentioned in the foregoing description, the external target device may be confirmed using an abbreviation or an alias naming.

In case that a user's speech is recognized as an alias naming 'refri', the controller 180 may determine an external target device as a refrigerator. In case that a user's speech is recognized as an alias naming 'box', the controller 180 may determine an external target device as a TV.

Optionally, in case the controller 180 confirms an external target device via speech, it may be able to transmit a paging signal to the confirmed external target device. Having received the paging signal, the external target device may transmit a response signal (e.g., speech information such as "Yes, sir!") to the mobile terminal 100.

Thus, if the external target device is confirmed via the user's speech, a control command for the confirmed external target device may be determined by receiving a user's speech again. An operation related to the control command is as good as the former operation described with reference to FIG. 10 and its details shall be omitted from the following description.

Figure 12:
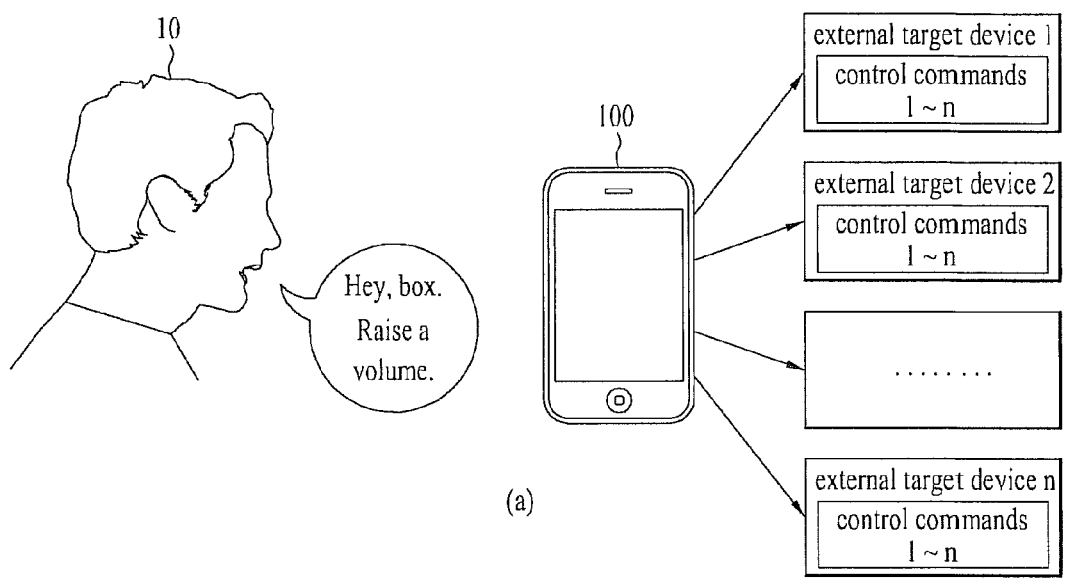
FIG. 12 shows an operation of confirming an external target device via a user speech and an operation of generating a control command for controlling the external target device.

FIG. 12 is a diagram for an operation of confirming an external target device via a user speech and an operation of generating a control command for controlling the external target device.

The case shown in FIG. 12 may be compared with the former case shown in FIG. 11 as follows. First of all, according to the description shown in FIG. 11, an external target device is confirmed via a single speech input and a control command for the external target device is determined separately from the confirmation. Secondly, according to the description shown in FIG. 12, an external target device is confirmed via a complex speech input and a control command for controlling the external target device can be confirmed as well.

Referring to FIG. 12 (a), if a user 10 says such a speech as "Hey, box! Raise a volume.", the microphone 122 receives the corresponding speech. The controller 180 determines the speech received via the microphone 122 as a text and then determines the exact meaning of the determined text.

The user's speech "Hey, box! Raise a volume." may include the information 'Hey, box!' on the external target device and the control command information 'Raise a volume.' together. Hence, using the speech 'Hey, box!', the controller 180 preferentially checks what is the external target device corresponding to the speech 'Hey, box!'. If what is the external target device corresponding to the speech 'Hey, box!' is checked, the controller 180 determines a control command corresponding to 'Raise a volume.' With reference to control commands corresponding to the external target device.

According to the embodiment shown in the drawing, the controller 180 may confirm 'Hey, box!' as an external target device TV and may determine 'Raise a volume.' As a TV volume controlling among control commands for the TV.

FIG. 12 (b) shows one example of external target devices and control commands, which are analyzed by the controller 180. Referring to FIG. 12 (b), first of all, if the microphone 122 receives a complex speech input "refri, any milk left?" from a user, the controller 180 confirms that an external target device is a refrigerator based on 'refri' and determines that a control command is a food monitoring command for the refrigerator based on 'any milk left?'. Thereafter, the controller 180 generates a control signal containing the food monitoring command for the refrigerator and may be then able to transmit the generated control signal to the server 200 or the refrigerator.

Secondly, if the microphone 122 receives a complex speech input "Hey, box! Raise a volume." from a user, the controller 180 confirms that an external target device is a TV based on 'Hey, box!' and determines that a control command is a volume controlling command for the TV based on 'Raise a volume.'. Thereafter, the controller 180 generates a control signal containing the volume controlling command for the TV and may be then able to transmit the generated control signal to the server 200 or TV.

Once a control signal for controlling an external target device arrives at the corresponding external target device, a control operation can be performed. In doing so, occasionally, the external target device may provide feedback information to the mobile terminal 100. For instance, information on a completion of the control operation may be provided as the feedback information.

In particular, in case of such a control command as a food monitoring 'any milk left?', a refrigerator, which is an external target device, is able to provide the mobile terminal 100 with the feedback information indicating that no milk is left. A user may be informed of this feedback information as a speech via the audio output module 152 of the mobile terminal 100 or as an image or text via the display unit 151 of the mobile terminal 100.

Moreover, when the mobile terminal 100 recognizes a speech command, if a speech recognition rate amounts to a predetermined level (e.g., smaller than 80%), it may lead the speech command to be inputted again. For instance, it may be able to perform a re-input leading action such as 'Say it again, please.', 'Say a device again, please.' and the like.

Meanwhile, in the first embodiment, the sensing unit 140 may be controlled to sense a body signal after a user's specific recognition mode has been entered. In the $2^{nd}$ embodiment, the microphone 122 may be controlled to sense a speech after a user's specific recognition mode has been entered.

In particular, a recognition mode may be entered only if a specific key (e.g., a home key, a lock key, a speech recognition hot key, a contact recognition hot key, etc.) is pressed for a prescribed duration. When the mobile terminal 100 is held to an ear for a prescribed duration, if the case of holding the mobile terminal 100 to the ear for the prescribed duration is checked via a proximity sensor, a recognition mode may be entered. Optionally, when a recognition mode enter icon is displayed on the touchscreen 151, only if the recognition mode enter icon is selected, a recognition mode may be entered.

In the following description, a method for the mobile terminal 100 to receive body information using a human body communication technology according to a further embodiment is explained.

First of all, according to the human body communication technology, a human body is used as a communication medium using a current flowing through the human body without separate power consumption. A human body has a good electric conduction property owing to plenty of electrolytes therein. Using this property, the human body may be used as a medium for transceiving various kinds of informations.

The human body communication technology is applicable to various fields. For instance, when a user carries a mobile terminal or product having a human body communication chip built therein, if the user touches a door of an apartment with his hand, the user's identification is automatically confirmed to open the door automatically by avoiding an input of a password. Moreover, when two strangers meet each other for the first time, if they carry mobile terminals capable of human body communications, their business cards can be automatically exchanged by shaking hands only.

According to one embodiment, if a body measuring chip or sensor is inserted in or attached to a random part of the body, it may be able to measure various kinds of body information on each part of the body using the human body communication technology. For instance, the body measuring chip or sensor measures and saves such a body information on each part of a body as a body temperature, a blood pressure, a pulse rate and the like.

When a user touches a specific part of a body, it may be able to measure a body information on the touched body part. In particular, when a user touches a specific body part with his hand, various kinds of body information on the touched specific body part can be measured by the body measuring chip or sensor. Optionally, in case that the user 10 touches the mobile terminal 100 or another product with a specific body part of the user 10, various kinds of body information on the touched part may be measured as well.

Thus, the body information on the specific body part, which is measured by the body measuring chip or sensor and then saved, may be transmitted to the mobile terminal 100 or an external device. As soon as the body measuring chip or sensor measures body information on a specific body part, the mobile terminal 100 may receive the corresponding body information. Optionally, if such a control command as a user's speech command and the like is inputted to the mobile terminal 100 or the body measuring chip or sensor, the corresponding body information may be transmitted to the mobile terminal 100. Subsequently, the mobile terminal 100 determines the received body information. If the body information is determined as deviating from a normal status, the mobile terminal 100 may be able to transmit abnormal information to a hospital or an external terminal.

A mobile terminal according to one embodiment, therefore, is able to control an external target device externally existing in a manner of having a user's body come in contact with the mobile terminal, thereby facilitating a user to match an external device.

Secondly, since a mobile terminal generates a signal having a different body frequency characteristic from each of various body parts, the present invention enables an external object to be matched to each different body frequency characteristic, thereby controlling a plurality of external objects.

According to one embodiment, the above-described methods can be implemented in a program recorded medium as computer-readable codes. The computer-readable media may include all kinds of recording devices in which data readable by a computer system are stored. The computer-readable media may include ROM, RAM, CD-ROM, magnetic tapes, floppy discs, optical data storage devices, and the like for example and also include carrier-wave type implementations (e.g., transmission via Internet). Further, the computer may include the controller 180 of the terminal.

According to another embodiment a mobile terminal comprises a sensor to generate a first body signal; an input device to receive a command signal; and a controller to determine a first target device corresponding to the first body signal, wherein first body signal includes information indicative of a characteristic of a first body part and wherein the command signal is to control an operation of the first target device. The characteristic may be a frequency generated from the first body part.

The first body signal may be based on a predetermined movement of a user of the mobile terminal, the first body signal may be based on a predetermined position of the first body part or another body part of a user, or the first body signal may be based on contact of the mobile terminal to the first body part.

The first body signal may be received from the first body part, and the characteristic of the first body part may be at least partially influenced based on a position of another body part.

The command signal may be received after the first body signal is generated, and the controller may generate a control signal for the first target device based on the command signal. The input device may be a microphone to receive speech corresponding to the command signal, and the first target device may be a home appliance, a home system, or an electronic information device.

In addition, the sensor may sense a second body signal corresponding to a second body part different from the first body part, and the controller may determine a second target device corresponding to the second body signal and may generate a signal for output to the second target device. Further, the second body signal may include information indicative of a characteristic of the second body part and wherein the first body signal is different from the second body signal.

According to another embodiment, a mobile terminal comprises a transmitter; a sensor to sense a first body signal from a first body part; and a controller to determine a first target device corresponding to the first body signal and to generate a signal for output to the first target device through the transmitter, wherein the first body signal includes information indicative of a characteristic of the first body part and wherein the first target device is different from the mobile terminal. The characteristic may be a frequency generated from the first body part.

The first body signal may be based on a predetermined movement of a user of the mobile terminal, the first body signal may be based on a predetermined position of the first body part or another body part of a user, or the first body signal may be based on contact of the mobile terminal to the first body part or another body part of a user. The signal generated for output to the first target device controls performance of an operation in the first target device.

The mobile terminal may also include an input device to receive a command, wherein the signal for output to the target device controls performance of an operation in the first target device corresponding to the command. The input device may be a microphone to receive speech corresponding to the command. The first target device may be a home appliance, a home system, or an electronic information device.

In addition, the sensor may sense a second body signal corresponding to a second body part different from the first body part, and the controller may determine a second target device corresponding to the second body signal and may generate a signal for output to the second target device. The second body signal may include information indicative of a characteristic of the second body part and the first body signal may be different from the second body signal.

According to another embodiment, a mobile terminal comprises generating a first body signal; receiving a command signal; and determining a first target device corresponding to the first body signal, wherein first body signal includes information indicative of a characteristic of a first body part and wherein the command signal is to control an operation of the first target device. The characteristic may be a frequency generated from the first body part.

The first body signal is based on a predetermined movement of a user of the mobile terminal, the first body signal is based on a predetermined position of the first body part or another body part of a user, and the first body signal is based on contact of the mobile terminal to the first body part.

The first body signal may be received from the first body part and the characteristic of the first body part may be at least partially influenced based on a position of another body part. The command signal may be generated based on speech received through a microphone. The first target device may be a home appliance, a home system, or an electronic information device.

The method may also include sensing a second body signal corresponding to a second body part different from the first body part; determining a second target device corresponding to the second body signal; and generating a signal for transmission to the second target device, wherein the second body signal includes information indicative of a characteristic of the second body part and wherein the first body signal is different from the second body signal.

According to another embodiment, a method for controlling a mobile terminal comprises receiving a first body signal; determining a first target device corresponding to the first body signal; and generating a signal for output to the first target device, wherein the first body signal includes information indicative of a characteristic of the first body part and wherein the first target device is different from the mobile terminal. The characteristic may be a frequency generated from the first body part.

The first body signal is based on a predetermined movement of a user of the mobile terminal, the first body signal is based on a predetermined position of the first body part or another body part of a user, and the first body signal is based on contact of the mobile terminal to the first body part or another body part of a user. The signal generated for output to the first target device controls performance of an operation in the first target device.

The method may also include receiving a command, wherein the signal for output to the target device controls performance of an operation in the first target device corresponding to the command. The command may be received based on a microphone. The first target device may be a home appliance, a home system, or an electronic information device.

The method may also include receiving a second body signal corresponding to a second body part different from the first body part; determining a second target device corresponding to the second body signal; and generating a signal for output to the second target device, wherein the second body signal includes information indicative of a characteristic of the second body part and wherein the first body signal is different from the second body signal.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. The features of one embodiment may be combined with the features of one or more of the other embodiments.

Although embodiments have been described with reference to a number of illustrative embodiments, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

I claim:

1. A mobile terminal comprising:
    a transmitter;
    a memory to store matching information on each target device matched to each body part;
    a sensor to generate a specific body signal and a first body signal after a user's specific recognition mode is entered;
    an input device to receive a command signal;
    a position location module to determine a current location of the mobile terminal; and
    a controller to ignore the specific body signal if the specific body signal includes information of a characteristic of a predetermined body part, and to determine a first target device corresponding to the first body signal by using the matching information,
    wherein the first body signal includes information indicative of a characteristic of a first body part, the characteristic of the predetermined body part is a frequency generated from the predetermined body part, the characteristic of the first body part is a frequency generated from the first body part and the command signal is to control an operation of the first target device,
    wherein the controller is configured to:
        transmit the command signal to the determined first target device through the transmitter if the current location corresponds to a first location, and
        transmit the command signal to an external server through the transmitter if the current location corresponds to a second location.

2. The mobile terminal of claim 1, wherein the first body signal is based on a predetermined movement of a user of the mobile terminal.

3. The mobile terminal of claim 1, wherein the first body signal is based on a predetermined position of the first body part or another body part of a user.

4. The mobile terminal of claim 1, wherein the first body signal is based on contact of the mobile terminal to the first body part.

5. The mobile terminal of claim 1, wherein the first body signal is received from the first body part and wherein the characteristic of the first body part is at least partially influenced based on a position of another body part.

6. The mobile terminal of claim 1, wherein the command signal is received after the first body signal is generated.

7. The mobile terminal of claim 1, wherein the input device is a microphone to receive speech corresponding to the command signal.

8. The mobile terminal of claim 1, wherein the first target device is a home appliance, a home system, or an electronic information device.

9. The mobile terminal of claim 1, wherein the sensor is to sense a second body signal corresponding to a second body part different from the first body part and the predetermined body part, and wherein the controller is to:
    determine a second target device corresponding to the second body signal, and
    generate a signal for output to the second target device, wherein the second body signal includes information indicative of a characteristic of the second body part and wherein the first body signal and the specific body signal are different from the second body signal.

10. A mobile terminal comprising:
    a transmitter;

a memory to store matching information on each target device matched to each body part;

a sensor to sense a specific body signal from a predetermined body part and a first body signal from a first body part after a user's specific recognition mode is entered;

a position location module to determine a current location of the mobile terminal; and a controller to ignore the specific body signal if the specific body signal includes information of a characteristic of the predetermined body part, to determine a first target device corresponding to the first body signal by using the matching information and to generate a signal for output to the first target device or an external server, wherein the first body signal includes information indicative of a characteristic of the first body part, the characteristic of the predetermined body part is a frequency generated from the predetermined body part, the characteristic of the first body part is a frequency generated from the first body part and the first target device is different from the mobile terminal, wherein the controller is configured to:
transmit the generated signal to the first target device through the transmitter if the current location corresponds to a first location, and
transmit the generated signal to the external server through the transmitter if the current location corresponds to a second location.

11. The mobile terminal of claim 10, wherein the first body signal is based on a predetermined movement of a user of the mobile terminal.

12. The mobile terminal of claim 10, wherein the first body signal is based on a predetermined position of the first body part or another body part of a user.

13. The mobile terminal of claim 10, wherein the first body signal is based on contact of the mobile terminal to the first body part or another body part of a user.

14. The mobile terminal of claim 10, wherein the signal generated for output to the first target device controls performance of an operation in the first target device.

15. The mobile terminal of claim 10, further comprising: an input device to receive a command, wherein the signal for output to the target device controls performance of an operation in the first target device corresponding to the command.

16. The mobile terminal of claim 15, wherein the input device is a microphone to receive speech corresponding to the command.

17. The mobile terminal of claim 10, wherein the first target device is a home appliance, a home system, or an electronic information device.

18. The mobile terminal of claim 10, wherein the sensor is to sense a second body signal corresponding to a second body part different from the first body part and the predetermined body part, and wherein the controller is to:
determine a second target device corresponding to the second body signal, and
generate a signal for output to the second target device, wherein the second body signal includes information indicative of a characteristic of the second body part and wherein the first body signal and the specific body signal are different from the second body signal.

19. A method for controlling a mobile terminal, comprising:
storing matching information on each target device matched to each body part;

generating a specific body signal and a first body signal after a user's specific recognition mode is entered;
receiving a command signal;
determining a current location of the mobile terminal;
determining a first target device corresponding to the first body signal and the specific body signal by using the matching information, wherein the specific body signal is ignored if the specific body signal includes information of a characteristic of a predetermined body part,
transmitting the command signal to the determined first target device if the current location corresponds to a first location, and
transmitting the command signal to an external server if the current location corresponds to a second location,
wherein the first body signal includes information indicative of a characteristic of a first body part, the characteristic of the predetermined body part is a frequency generated from the predetermined body part, the characteristic of the first body part is a frequency generated from the first body part and the command signal is to control an operation of the first target device.

20. The method of claim 19, wherein the first body signal is based on a predetermined movement of a user of the mobile terminal.

21. The method of claim 19, wherein the first body signal is based on a predetermined position of the first body part or another body part of a user.

22. The method of claim 19, wherein the first body signal is based on contact of the mobile terminal to the first body part.

23. The method of claim 19, wherein the first body signal is received from the first body part and wherein the characteristic of the first body part is at least partially influenced based on a position of another body part.

24. The method of claim 19, wherein the command signal is generated based on speech received through a microphone.

25. The method of claim 19, wherein the first target device is a home appliance, a home system, or an electronic information device.

26. The method of claim 19, further comprising:
sensing a second body signal corresponding to a second body part different from the first body part and the predetermined body part;
determining a second target device corresponding to the second body signal; and
generating a signal for transmission to the second target device,
wherein the second body signal includes information indicative of a characteristic of the second body part, and wherein the first body signal and the specific body signal are different from the second body signal.

27. A method for controlling a mobile terminal, comprising:
storing matching information on each target device matched to each body part;
receiving a specific body signal and a first body signal;
determining a current location of the mobile terminal;
determining a first target device corresponding to the first body signal by using the matching information and the specific body signal, wherein the specific body signal is ignored if the specific body signal includes information of a characteristic of a predetermined body part;
generating a signal for output to the first target device or an external server, transmitting the generated signal to the determined first target device if the current location corresponds to a first location, and transmit the generated signal to the external server if the current location corresponds to a second location wherein the first body signal includes information indicative of a characteristic of the first body part, the characteristic of the predetermined body part is a frequency generated from the predetermined body part, the characteristic of the first body part is a frequency generated from the first body part and the first target device is different from the mobile terminal.

28. The method of claim 27, wherein the first body signal is based on a predetermined movement of a user of the mobile terminal.

29. The method of claim 27, wherein the first body signal is based on a predetermined position of the first body part or another body part of a user.

30. The method of claim 27, wherein the first body signal is based on contact of the mobile terminal to the first body part or another body part of a user.

31. The method of claim 27, wherein the signal generated for output to the first target device controls performance of an operation in the first target device.

32. The method of claim 27, further comprising:

receiving a command, wherein the signal for output to the target device controls performance of an operation in the first target device corresponding to the command.

33. The method of claim 32, wherein the command is received based on a microphone.

34. The method of claim 27, wherein the first target device is a home appliance, a home system, or an electronic information device.

35. The method of claim 27, further comprising:

receiving a second body signal corresponding to a second body part different from the first body part and the predetermined body part;

determining a second target device corresponding to the second body signal; and generating a signal for output to the second target device, wherein the second body signal includes information indicative of a characteristic of the second body part and wherein the first body signal and the specific body signal are different from the second body signal.

* * * * *